J. W. HEADLY.
PIPE COUPLING DEVICE.
APPLICATION FILED APR. 29, 1915.
1,160,284.
Patented Nov. 16, 1915.
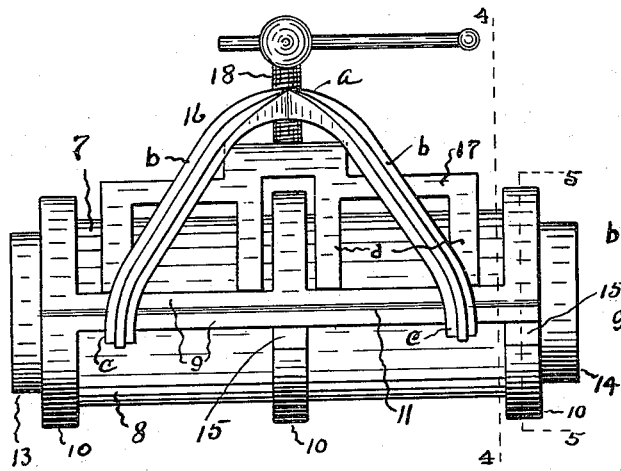
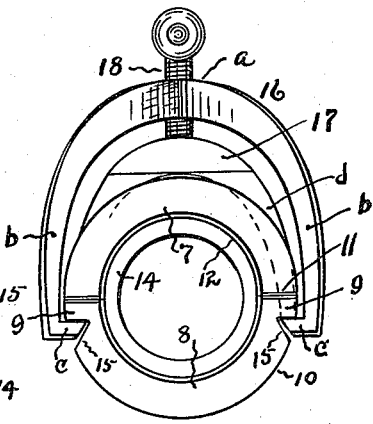
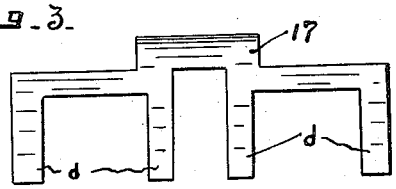
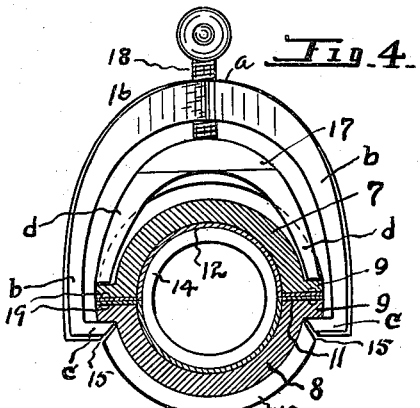
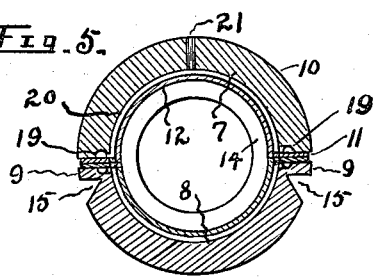
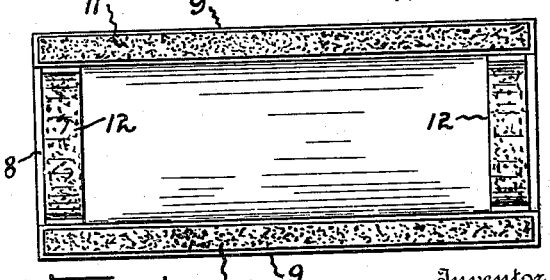
Witnesses
J. P. Palmer.
Wm Bowers.
Inventor
James W. Headly.
By Hiram A. Sturges.
Attorney

UNITED STATES PATENT OFFICE.

JAMES W. HEADLY, OF OMAHA, NEBRASKA, ASSIGNOR OF ONE-HALF TO OLIVER A. MOORE, OF OMAHA, NEBRASKA.

PIPE-COUPLING DEVICE.

1,160,284.  Specification of Letters Patent.  Patented Nov. 16, 1915.

Application filed April 29, 1915. Serial No. 24,730.

*To all whom it may concern:*

Be it known that I, JAMES W. HEADLY, a citizen of the United States, residing at Omaha, in the county of Douglas and State of Nebraska, have invented certain new and useful Improvements in Pipe-Coupling Devices, of which the following is a specification.

This invention relates to an improvement in pipe couplings, and has for its principal object to provide a device by means of which water mains or pipe may be quickly connected when disposed end to end without the use of solder, calking or pipe unions, and which also may be used upon pipes containing air under pressure, steam, or upon water pipes when bursted from freezing or other causes.

The invention broadly includes a bifurcated sleeve, the segments of which are adapted to be disposed upon opposed sides of a pipe, and means for pressing the two parts or halves of the sleeve upon the pipe in a manner to prevent the escape of the air, steam or water contained therein, and it consists of the novel construction, combination and arrangement of parts as described herein and claimed, and as illustrated in the drawing, wherein,—

Figure 1 is a view of the device in side elevation. Fig. 2 is an end view of the same. Fig. 3 is a side view of the brace or spider. Fig. 4 is a section on line 4 4 of Fig. 1. Fig. 5 is a transverse section through the segments on line 5 5 of Fig. 1. Fig. 6 is a plan view showing the convexed or inner side of one of the segments.

Referring now to the drawing for a more particular description, numerals 7 and 8 indicate a pair of elongated, cylindrical segments, each being provided adjacent to its longitudinal edges with outwardly projecting, rectilinear flanges 9 and provided on its convexed side with transversely disposed reinforcing flanges 10, and also provided on its longitudinal edges with strips 11 and upon its concaved wall with transversely disposed strips 12, said strips consisting of oakum, hemp, rubber, leather or other suitable packing material. The cylindrical segments may have any required length or proportion for circumscribing the end portions of two adjacent tubes or pipes 13 and 14 where the device is used as a pipe coupling, or for circumscribing a single pipe when used for emergency purposes for preventing leakage, the segment 8 being provided with recesses 15 formed in its flanges 10 to open upon its rectilinear flanges 9.

In order that the segments may be readily pressed upon opposed sides of a pipe with great force, a suitable clamp 16 is employed, preferably consisting of a head *a* provided with arms *b* arranged in pairs, each having a terminal hook *c*, and so arranged that the head will be disposed outwardly of the segment 7 midway between the ends of the segments, the hooks being adapted to catch under the flanges 9 of segment 8, and near the ends thereof, a spider 17 preferably being employed and interposed between the segment 7 and the head *a* of the clamp with its arms *d* engaging the flanges 9 of the last named segment. By means of the screw 18 which is threaded in the head *a* and which may engage the top of the spider, the two segments may be moved toward each other with great force so that the packing strips 11 and 12 will be compressed in a degree sufficiently to prevent escape of the contents of the pipe or pipes.

At 19 are indicated recesses formed in the segments, adjacent to the flanges 9 thereof, to open on their rectilinear edges, and at 20 are indicated recesses formed in the convexed wall, adjacent to the ends of each segment and which communicate with recesses 19, said recesses 20 being provided with ports 21 disposed midway between the longitudinal edges of segment 7, and in instances where the pipes are of large bore and disposed horizontally, melted lead or the like may be introduced into the recesses, in a well known manner, by use of one of the ports, as a substitute for the packing already described.

The segments may be manufactured of various dimensions to correspond with the size of different kinds of pipe. In operation, after the segments have been so placed that they circumscribe the pipe, and the spider has been interposed, the clamp is mounted outwardly of the spider, the arms of the spider and hooks of the clamp engaging opposed parts of the adjacent flanges 9, the recesses 15 permitting the hooks *c* to make this engagement since the hooks must pass the transverse flanges of segment 8 when moved longitudinally of the segments for the mounting described. The screw may then be rotated for compressing the packing.

Among some of the advantages to be derived by use of the device, it may be stated that the parts are few and may be conveniently and economically manufactured. The flanges operate to reinforce the segments to advantage, and therefore the segments may be of attenuated form and less weight and material will be required. The device is of particular advantage for use as an emergency appliance when leakage of water pipes occurs from freezing or other causes, since the parts may be quickly applied by any person of ordinary skill; and, as is obvious, may be used as a coupling for pipes of very large diameters, melted lead being employed, the particular advantages being a saving of time and cost of labor; and in instances where the pipes are to be thereafter disconnected, the work required for separation may be quickly performed.

It will be understood, of course, that the use of lead in the recesses mentioned, as an obstruction element, is a substitute for the strips 11 and 12, and as explained either may be used. When the strips of packing are employed they are disposed to completely cover the recesses, so that steam, compressed air or water will not escape by passing outwardly through said recesses.

Having fully described the construction, a further explanation relating to operation is not necessary.

What I claim and desire to secure by Letters Patent is,—

In a coupling device for pipes, a pair of plates formed concavo-convex in cross-section adapted to be disposed upon opposed sides of said pipes, each of the plates being provided with outwardly projecting flanges near its longitudinal edges, packing strips between the longitudinal edges of said plates, packing strips between the plates and said pipes, a spider disposed outwardly of one of said plates and having a plurality of arms in engagement with the flanges thereof, and a clamping member for moving the plates toward each other, said clamping member being disposed outwardly of and in engagement with the spider and having arms for engagement with the flanges of the plate opposite to said spider.

In testimony whereof, I have affixed my signature in presence of two witnesses.

JAMES W. HEADLY.

Witnesses:
HIRAM A. STURGES,
MABEL CHURCH.

Copies of this patent may be obtained for five cents each, by addressing the "Commissioner of Patents, Washington, D. C."